United States Patent [19]

Kushida et al.

[11] Patent Number: 4,673,163

[45] Date of Patent: Jun. 16, 1987

[54] ELECTROMAGNETIC ACTUATORS

[75] Inventors: Takeo Kushida; Keiichi Yamada, both of Higashi-Matsuyama, Japan

[73] Assignee: Diesel Kiki Co., Ltd., Tokyo, Japan

[21] Appl. No.: 814,724

[22] Filed: Dec. 30, 1985

[30] Foreign Application Priority Data

Jan. 11, 1985 [JP] Japan .................................... 60-2696

[51] Int. Cl.[4] .......................... F16K 31/06; H01F 7/12

[52] U.S. Cl. ............................ 251/129.1; 251/129.16; 335/246; 335/247

[58] Field of Search ...................... 251/129.16, 129.09, 251/129.1; 335/243, 244, 247, 246, 100, 102

[56] References Cited

U.S. PATENT DOCUMENTS 3,133,234 5/1964 Dietz .......................... 251/129.09 X
3,383,084 5/1968 Mayfield ...................... 251/129.1 X

FOREIGN PATENT DOCUMENTS 174774 10/1983 Japan ................................ 251/129.1

*Primary Examiner*—Arnold Rosenthal
*Attorney, Agent, or Firm*—Wenderoth, Lind & Ponack

[57] ABSTRACT

An electromagnetic actuator in which a stator and an armature are opposed to move relatively. A plurality of coils are provided on the stator in the radial direction. A slit is formed on the armature in a radial direction and the flow of the eddy current in the circumferential direction is prevented.

4 Claims, 5 Drawing Figures

FIG. 4 - PRIOR ART
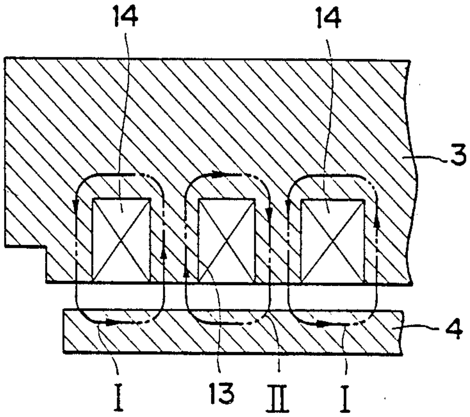
FIG. 5 - PRIOR ART
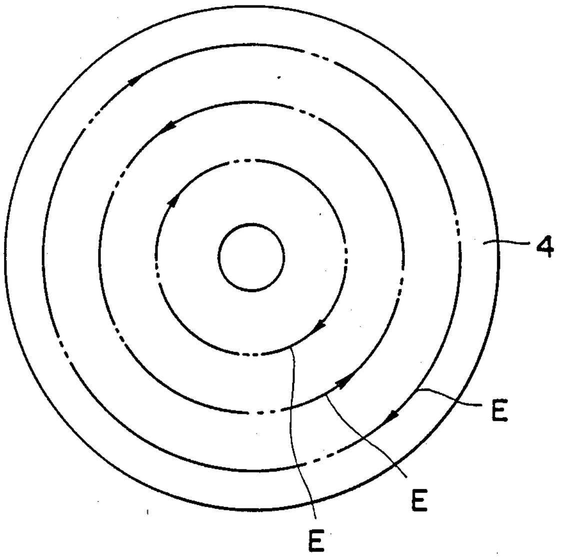

ELECTROMAGNETIC ACTUATORS

FIELD OF THE INVENTION

This invention relates to electromagnetic actuators for operation by electromagnetic force, and more particularly to electromagnetic actuators for use in electromagnetic valves for controlling opening or closing of, for example, a fuel jet valve.

PRIOR ART

As a conventional example of an electromagnetic actuator of this kind, an actuator is disclosed in the official gazette of Japanese Patent Laid-open Publication No. 53-120017. This actuator is constructed in such a way as shown in FIG. 4 that a stator 3 and an armature 4 are opposed to move relatively in a mutual plane, a plurality of coils 14 are provided in a radial direction of the stator 3, the electric current supply directions of the adjacent coils 14 are set inversely, and magnetic fluxes I and II of different directions are generated between the stator 3 and the armature 4 to operate at high speed.

However, in the conventional art, as shown in FIG. 5, since the armature 4 is formed to have a disc shape, and when the coil 14 is excited, overcurrent E flowing in a peripheral direction is generated in the armature 4, and a sharp increment of the magnetic flux is interrupted by the eddy current E that results in deteriorated responsiveness which has been problems.

SUMMARY OF THE INVENTION

An object of this invention is to provide electromagnetic actuators that prevent generation of the eddy current mentioned above and responds at high speed.

Another object of this invention is to increase an intensity of the armature by forming a slit on an armature and by contributing to a high speed operation by reducing weight of the armature.

According to this invention, an electromagnetic actuator is provided which is comprised of a pair of members made of magnetic materials which are opposed to move relatively on a mutual plane, a plurality of coils which are provided in a radial direction of one member of said pair of members having their electric current supply direction set inversely with the adjacent coils and at least one slit formed in a radial direction of the other member of said pair of the members.

Many other advantages, features and additional objects of the present invention will become mainfest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 4 is a view showing a cross section of the conventional electromagnetic actuator; and FIG. 5 is a plan view showing the armature used in the conventional electromagnetic armature shown in FIG. 4.

DETAILED DESCRIPTION OF THE INVENTION

Figure 1:
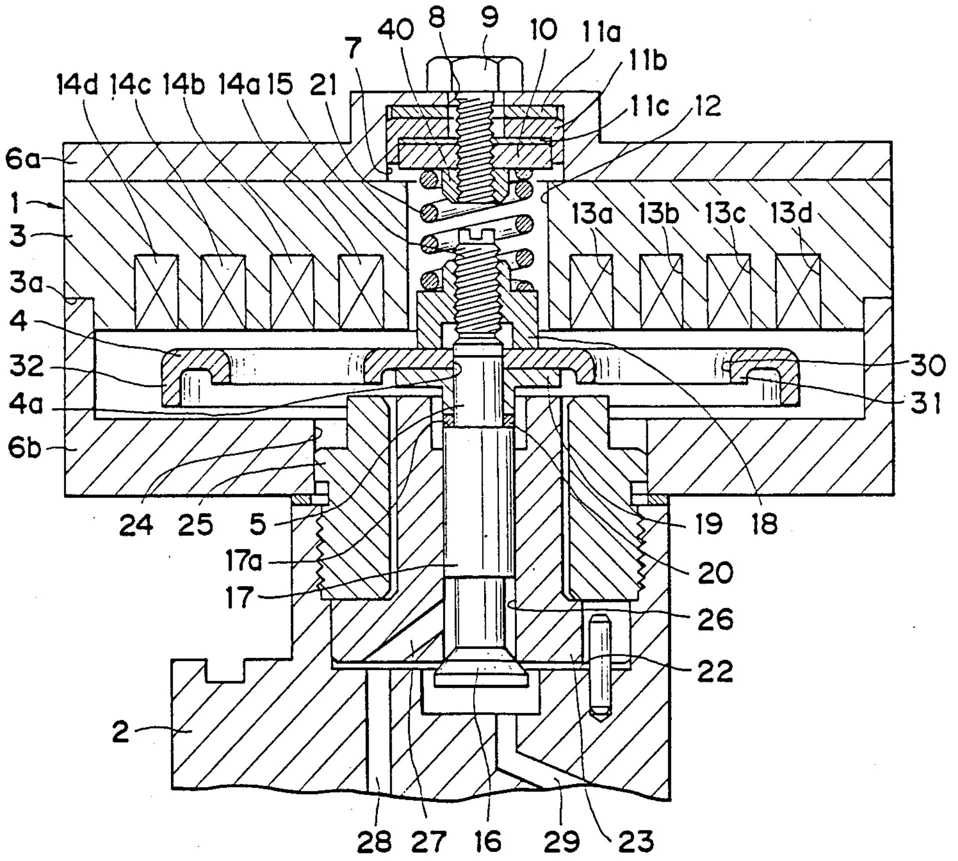
FIG. 1 is a view showing a cross section of an electromagnetic valve including a cross section of an electromagnetic actuator according to an embodiment of this invention.

In FIG. 1, an electromagnetic actuator 1 forms an electromagnetic valve mounted on a fuel jet valve proper 2.

The electromagnetic actuator 1 is provided with a stator 3 made of magnetic material and an armature 4 made of magnetic material similar to that of the stator 3. The stator and the armature 4 are disposed on a mutual axis and are opposed with each other, and a valve rod 5 is fixed to the armature 4.

The stator 3 is connected to an upper housing 6*a* on its upper surface. Lower housing 6 is fixed to the lower surface of the stator by end surfaces of the lower housing 6*b* joined to step portions 3*a* formed on a peripheral edge of the stator.

A concave portion 7 is formed in the center of the upper housing 6*a*, and a bolt 9 is inserted into a screw inserting hole 8 form on the concave portion. In the bolt 9, an upper spring receiver 10 is screwed by a nut 40 in the concave portion 7, and spacers 11*a*–11*c* are interposed between the upper spring receiver 10 and the bottom surface of the concave portion 7.

Also, a center hole 12 is formed in the center of the stator 3, and for example, four coil grooves 13*a*–13*d* are formed concentrically on the lower surface of the stator 3 around the center hole 12. Concentric coils 14*a*–14*d* are embedded in the coil grooves 13*a*–13*d*, and adjacent winding directions of the coils 14*a*–14*d* are arranged to be reversed.

Accordingly, similar to the conventional example shown in FIG. 4, magnetic fluxes I, II of opposite directions are generated around the coils 14*a*–14*d*, and the armature 4 attracted to the stator 3 strongly.

A through hole 4*a* is formed in the center of the armature 4, and the valve rod 5 is inserted in the through hole 4*a*. This valve rod 5 is formed with a male thread portion 15 at one end, a conical valve head portion 16 on the other end, and a large diametral portion 17 between the male thread portion 15 and the valve head portion 16. The valve rod 15 is arranged to be guided in vertical direction by sliding in a slide hole 26 of a valve seat 23, to be described hereinafter by, the large diametral portion 17. The male thread portion 15 is disposed at the center hole 12 of the armature 4, and a holding member 18 is screwed to the male thread portion 15, and the armature 4 is sandwiched by the holding member 18 and a receiving member 19.

Also, the receiving member 19 inserted onto the valve rod 5 is mounted on one end surface 17*a* of the large diametral portion 17 by means of a shim 20. Between the upper spring receiver 10 and the holding member 18, a spring 21 is resiliently interposed in the center hole 12 of the stator 3, and a armature 4 and the valve rod 5 are urged in the downwards direction.

The fuel jet valve proper 2 is provided in the lower part of the lower housing 6*b*. A valve seat 23 slidable in an axial direction is housed in a valve seat chamber 22 formed in the fuel jet valve proper 2, and a mounting member 25 is screwed to an inner peripheral surface of the valve seat chamber 22 in the opening portion of the valve seat chamber 22 communicating with a coupling hole 24 formed in the lower housing 6*b*. The mounting member 25 abuts the valve seat 23 when an upwards valve seat 23 slides in the upper direction, and controls the upward sliding motion of the valve seat 23. Also, in the center of the valve seat 23, a slide hole 26 is formed in which the valve rod 5 is slidable vertically. A communication path 27 is formed having one end communicating with this slide hole 26, and the other end open to the lower surface of the valve seat 23.

Moreover, in the fuel jet valve proper 2, a fuel inlet path 28 and a fuel outlet path 29 are formed, and the paths communicate with the valve seat chamber 22. An opening of the fuel outlet path 29 is disposed at an opening of the slide hole 26. Accordingly, when the valve rod 5 is displaced in the lower direction by the spring 21, the valve head portion 16 is separated from the valve member 23, and the fuel inlet path 28 and the fuel outlet path 29 are placed in communication by means of a communicating path 27, and the pressurized fuel by a plunger (not shown) connected to the fuel inlet path 28 escapes to the fuel outlet path 29.

Figure 2:
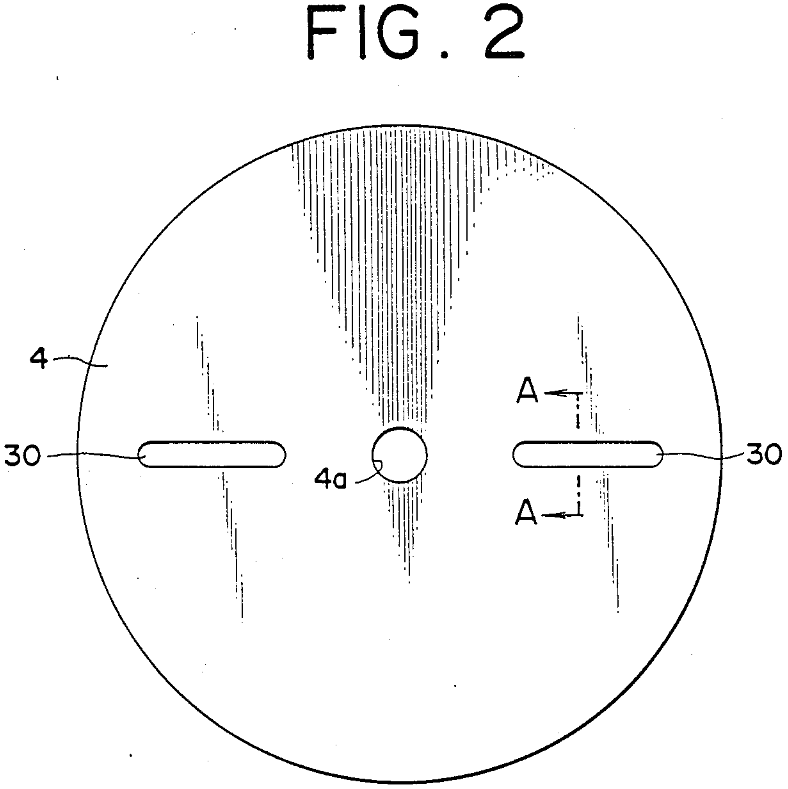
FIG. 2 is a plan of an armature of the electromagnetic actuator mentioned above.
Figure 3:
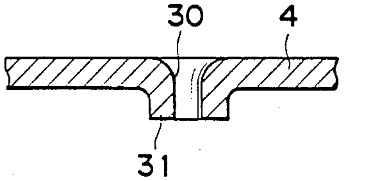
FIG. 3 is a view taken along a line A—A of FIG. 2.

The armature 4 is formed with a slit 30 in the radial direction of the armature 4 as shown in FIGS. 2 and 3, and a peripheral edge of the slit 30 is bent to the side of the lower surface of the armature 4 to form a first bent portion 31. Also, a peripheral edge of the armature 4 is bent to this side opposite the stator to form a second bent portion 32.

In the foregoing construction, when the electric current is supplied to the coils 14*a*–14*d*, as described in the foregoing, the magnetic fluxes I, II are generated around the coils 14*a*–14*d* and thus the armature 4 is attracted to the stator 3, and the valve rod 5 is shifted upward against the spring 21, and the valve head portion 16 is seated on the valve seat 23, and the flow of the fuel is interrupted. In the conventional example as shown in FIG. 5, the eddy current flowing in the circumferential direction of the armature 4 is generated by the magnetic fluxes I, II which prevent an increment of the magnetic fluxes, and thus, the movement of the armature becomes slow. In this invention, on the other hand, since the slit 30 is formed on the armature 4, the annular eddy current does not flow, and the increment of the magnetic fluxes is not interrupted and the movement of the armature 4 is accelerated. When the supply of electric current to the coils 14*a*–14*d* is interrupted, the armature 4 and the valve rod 5 are shifted, downwards by the spring 21, and the valve head portion 16 is separated from the valve seat 23 and the fuel escapes to the fuel outlet path 29.

Obviously, many modifications and variations of the present invention are possible in the light of the above teachings. It is therefore to be understood that within the scope of the appended claims, the invention may be practiced otherwise than as specifically described.

What is claimed is:

1. An electromagnetic actuator comprising:

a housing;

a stator of magnetic material fixed relative to said housing, said stator having a plurality of concentric coils mounted to a surface thereof and through each of which electric current is passed in an opposite direction to that of an adjacent coil for generating a respective magnetic flux around each of said coils; and an armature slidably mounted relative to said housing and adjacent said stator, said armature comprising a thin magnetic plate and having a surface facing and disposed in a plane parallel to said surface of said stator, said armature being attracted to said stator to slide towards said stator when the electric current is passed through said coils of said stator, said armature having at least one slit extending therethrough and elongated in a radial direction from the center of said armature, the portion of said armature around the periphery of said slit being bent outward from the surface of said armature opposite said surface of said armature facing said stator, and said at least one slit being positioned on said stator opposed to said plurality of coils through which the electric current is passed for reducing eddy currents induced by the magnetic fluxes around each of said coils, which eddy currents interfere with the attraction of said armature to said stator.

2. An electromagnetic actuator as claimed in claim 1 wherein, the outer peripheral edge of said armature comprising a thin magnetic plate is bent outward from the surface of said armature opposite said surface of said armature facing said stator.

3. An electromagnetic actuator as claimed in claim 1 and further comprising, a valve rod slidably mounted in said housing; and said valve rod being fixed to said armature at said center of said armature to be slidable therewith when said armature is attracted to said stator.

4. An electromagnetic actuator as claimed in claim 3 wherein, said housing has a fuel path extending therethrough; and said valve rod to which said armature is fixed is slidable between a first position in which said fuel path is closed by said valve rod and a second position in which said fuel path is open.

* * * * *